Sept. 22, 1964   B. T. BRASFIELD ETAL   3,149,597
EXPANDABLE HOOP FIXTURE

Filed Jan. 18, 1960   2 Sheets-Sheet 1

Buel T. Brasfield,
William R. Potter
INVENTOR.

BY

Sept. 22, 1964   B. T. BRASFIELD ETAL   3,149,597
EXPANDABLE HOOP FIXTURE
Filed Jan. 18, 1960   2 Sheets-Sheet 2
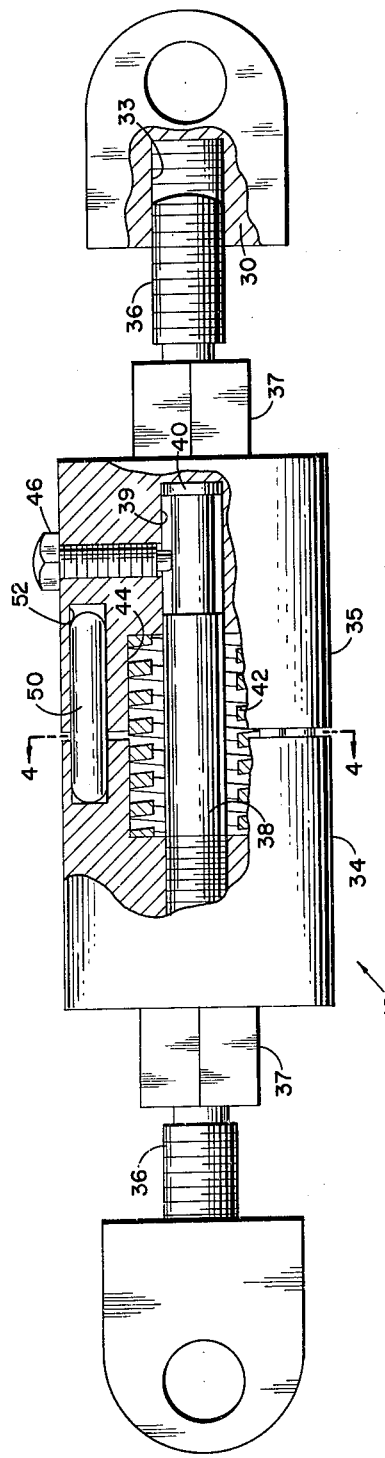
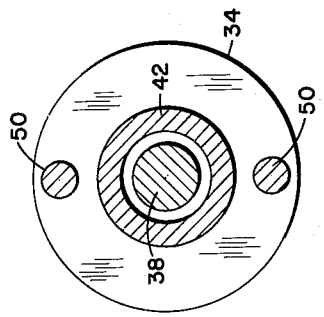
FIG. 4
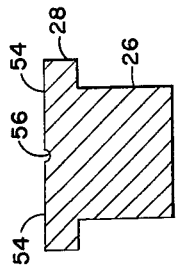
FIG. 5
Buel T. Brasfield,
William R. Potter
    *INVENTOR.*
BY

United States Patent Office 3,149,597
Patented Sept. 22, 1964

3,149,597
EXPANDABLE HOOP FIXTURE
Buel T. Brasfield, 2329 Gallatin St. SW., and William R. Potter, 124 Crestline Road, both of Huntsville, Ala.
Filed Jan. 18, 1960, Ser. No. 3,213
6 Claims. (Cl. 113—102)
(Granted under Title 35, U.S. Code (1952), sec. 266)

The invention described herein may be manufactured and used by or for the Government for governmental purposes without the payment of any royalty thereon.

Our invention relates to an expandable hoop fixture to support a section of a cylinder during expansion and contraction thereof to control the shape of the section.

Warping of a circumferential section of a cylinder during heating and cooling thereof can be materially reduced by control of the shape of the joint in the process. Such warping is proportionate to the diameter and thickness of the cylinder and in fabrication of an aluminum cylinder of large diameter (of the order of 70 inches) and of small thickness (under 0.5 inch) by welding a joint between a pair of component cylinders, particularly careful control of the shape of the joint during the welding is required to reduce the warping to a minimum.

An object of our invention therefore is to provide a hoop fixture to control the shape of a section of a cylinder during heating and cooling thereof.

Another object of our invention is to provide such a fixture to control the shape of a cylindrical joint during welding thereof.

A further object of our invention is to apply hoop stress continuously to a cylindrical enclosure during heating and cooling thereof.

Other aims and objects of our invention will appear from the following explanation thereof.

In carrying out our invention, a hoop fixture includes a series of cylindrical segments connected by turnbuckles for internal support engagement with a section of a cylinder, during expansion and contraction thereof and for continuous application of hoop stress to the joint to control warping thereof.

The section may comprise a joint formed by the contiguous ends of cylindrical components of the cylinder and the expansion and contraction may result from the heating and cooling of the joint by seam welding thereof.

For more complete understanding, reference is directed to the following description and the accompanying drawing, in which, FIGURE 1 is a perspective view of a hoop fixture incorporating our invention disposed within a cylindrical joint, FIGURE 2 is an enlarged elevation, partly in section, of the fixture;

FIGURE 3 is an enlarged view of the turnbuckle shown in FIGURE 2;

FIGURE 4 is a view along line 4—4 of FIGURE 3; and

FIGURE 5 is a view along line 5—5 of FIGURE 2.

Figure 1:
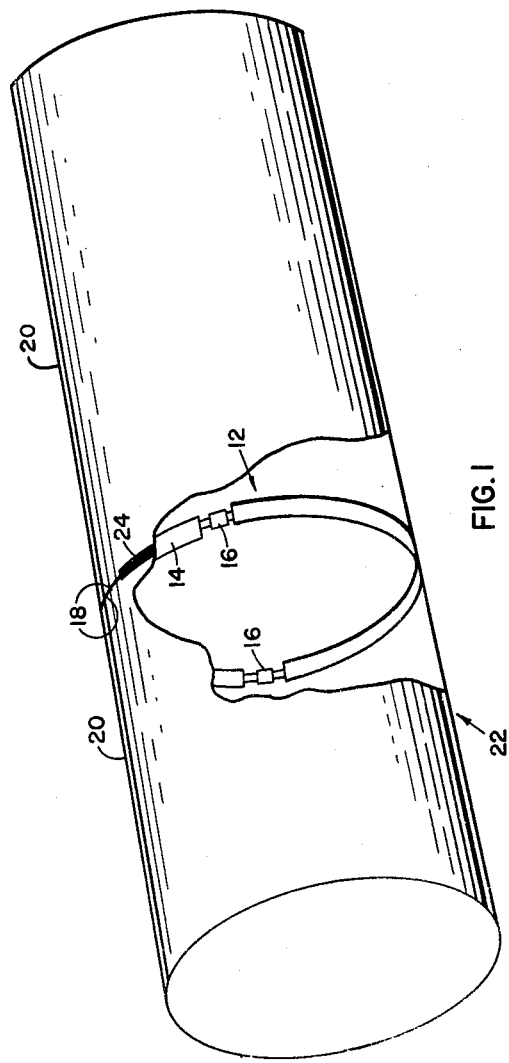
Figure 2:
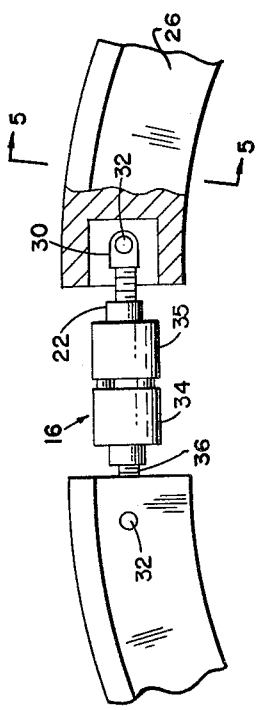

Accordingly, a hoop fixture 12 includes cylindrical segments 14 serially connected by turnbuckles 16 for internal engagement of the segments with ends 18 of cylindrical components 20 secured by means (not shown) to form a cylinder 22.

Ends 18 are contiguously disposed to form a joint section 24 of the cylinder, for seam welding of the joint by progress of a welding head (not shown) therearound.

Each of the segments includes a web 26 and a cylindrical flange 28 normally secured thereto.

Each of the turnbuckles includes a pair of brackets 30 respectively secured to adjacent webs 26 for pivoted relation therewith as by rivets 32, and provided with oppositely threaded holes 33. Each of the turnbuckles includes a pair of members 34 and 35 respectively including stud bolts 36 secured thereto and oppositely threaded for respective engagement in holes 33. Bolts 36 respectively include heads 37.

Member 34 includes a tang 38 threaded therein and disposed for slidable engagement in an aperture 39 in member 35. A flange stop 40 is disposed in the free end of tang 38. A spring 42 is disposed to enclose tang 38, in coaxial relation therewith and the spring extends within axial recesses 44 in the members. Member 35 is provided with a set screw 46 for engagement with stop 40 for prestressed compressed relation of spring 42.

Pins 50 are disposed for slidable engagement in corresponding holes 52 radially spaced from tang 38 for simultaneous rotation of members 34 and 35.

Flange 28 is provided with a pair of surfaces 54 of substantially equal width and radii substantially equal to the inside radius of cylinder 22 for maximum engagement therewith and conduction of heat therefrom.

Surfaces 54 are separated by a recess 56 disposed to accommodate a bead from the weld.

As the welding head proceeds around joint 24, the expansion due to the local heating of the weld tends to distort the cylindricality of the joint. Springs 42 are disposed intermediate members 34 and 35 in biased relation therewith for application of a force therebetween for relative movement of the respective members 30 of each of the turnbuckles to radially expand and contract the hoop to retain segments 14 in engagement with joint 24, and apply hoop stress thereto within the elastic limit thereof during the heating and subsequent cooling, to minimize warping of the joint.

*Operation*

Fixture 12 is assembled by insertion of tang 38 in aperture 39 and pins 50 in holes 52 to compress spring 42 in recesses 44. Set screw 46 is disposed in member 35 to engage head 40 and retain the spring in the precompressed relation. Bolts 36 are rotated to full threaded engagement with brackets 30 for minimum diameter of hoop 12.

The bolts are oppositely rotated for engagement of segments 14 with joint section 24, and the opposite rotation is continued with stop 40 remaining in engagement with set screw 46, for application of hoop stress to section 24.

This fixture has been employed in missile application, in which cylindricality of the components is maintained within close tolerance. The respective segments 14 follow the local expansions and contractions as the welding head traverses the joint, to continue to apply the hoop stress thereto, and retain substantially the same close tolerance for the completed joint.

The fixture has been successfully employed in the fabrication of the large diameter, thin-walled skins of missiles and satellite boosters.

While the foregoing is a description of the preferred embodiment, the following claims are intended to include those modifications and variations that are within the spirit and scope of our invention.

We claim:
1. A fixture for use in welding the abutting ends of two cylindrical components, comprising a plurality of cylindrical segments and turnbuckles secured in alternate serial relation to form a hoop, said hoop disposed within said components for internal engagement of said segments with each of said components, each of said turnbuckles including a pair of moveable end members respectively secured to alternate ones of said segments in biased relation therewith for radial expansion and contraction of said hoop responsive to heating and cooling of said components, said hoop disposed for application of a continuous hoop stress to said components responsive to the radial expansion and contraction thereof.

2. A fixture as in claim 1 wherein each of said segments comprises a web, said web having a flange disposed in normal relation thereto, said flange having a cylindrical surface for internal engagement with the abutting ends of said components, and a central, circumferential groove to accommodate a bead during welding.

3. A fixture as in claim 2 wherein each of said turnbuckles comprises a pair of flexibly secured members, a bracket secured to the outer end of each member and disposed for connection to the adjacent web, and a compressed spring contained within said members for displacement of each of said members in opposite directions for simultaneous radial displacement of said cylindrical segments.

4. A fixture as in claim 3 with said members provided with corresponding recesses to enclose said spring; one of said members provided with an aperture coaxial with said recesses; a tang with a head secured to the other of said members for slidable engagement in said aperture; and a setscrew disposed in said one member for engagement with said head to prevent complete decompression of said spring.

5. A fixture as in claim 4 with said members oppositely threaded in said brackets and disposed for rotation to control the diameter of said fixture.

6. A fixture as in claim 5 with said members provided with corresponding holes axially spaced from said recesses and pins for slidable engagement in said holes for simultaneous rotation of said members.

References Cited in the file of this patent

UNITED STATES PATENTS

| | | |
|---|---|---|
| 778,889 | Plowden | Jan. 3, 1905 |
| 1,226,002 | Peeper | May 15, 1917 |
| 1,663,602 | Marnell | Mar. 27, 1928 |
| 2,331,689 | Hodge | Oct. 12, 1943 |
| 2,380,071 | Planett | July 10, 1945 |
| 2,430,266 | Zimmerman | Nov. 4, 1947 |
| 2,718,864 | Fike | Sept. 27, 1955 |
| 2,804,836 | Tiedemann | Sept. 3, 1957 |

FOREIGN PATENTS

| | | |
|---|---|---|
| 7,565 | Great Britain | 1896 |
| 414,951 | Germany | June 18, 1925 |